(12) United States Patent
Kuroiwa et al.

(10) Patent No.: US 9,221,135 B2
(45) Date of Patent: Dec. 29, 2015

(54) ROTOR MANUFACTURING METHOD

(71) Applicant: KABUSHIKI KAISHA YASKAWA DENKI, Kitakyushu-shi (JP)

(72) Inventors: Yasufumi Kuroiwa, Kitakyushu (JP); Kanta Yamaguchi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 220 days.

(21) Appl. No.: 13/775,252

(22) Filed: Feb. 25, 2013

(65) Prior Publication Data

US 2013/0239378 A1 Sep. 19, 2013

(30) Foreign Application Priority Data

Mar. 19, 2012 (JP) ................. 2012-062148

(51) Int. Cl.
*H05K 13/00* (2006.01)
*B23P 15/04* (2006.01)
*H02K 1/27* (2006.01)
*H02K 15/03* (2006.01)

(52) U.S. Cl.
CPC ............... *B23P 15/04* (2013.01); *H02K 1/278* (2013.01); *H02K 15/03* (2013.01); *Y10T 29/37* (2015.01); *Y10T 29/49337* (2015.01)

(58) Field of Classification Search
CPC ... H02K 15/00; H02K 15/0018; H02K 15/02; H02K 1/278; H02K 15/03; B23P 15/04; Y10T 29/49337; Y10T 29/37
See application file for complete search history.

(56) References Cited

U.S. PATENT DOCUMENTS 5,040,286 A 8/1991 Stark
2011/0127870 A1 6/2011 Onda et al.

FOREIGN PATENT DOCUMENTS

EP 0 143 693 A2 * 8/1985
JP 2011-120328 6/2011

OTHER PUBLICATIONS

Chinese Office Action for corresponding CN Application No. 201310085059.0, Dec. 29, 2014.

* cited by examiner

*Primary Examiner* — Carl Arbes
(74) *Attorney, Agent, or Firm* — Mori & Ward, LLP

(57) ABSTRACT

A rotor manufacturing apparatus includes a pusher and multiple blades. The pusher presses multiple magnets that are temporarily attached to a rotor core and arranged side by side in a circumferential direction of the rotor core from an outer side in a radial direction of the rotor core. The multiple blades are individually inserted into gaps between the magnets pressed by the pusher.

20 Claims, 7 Drawing Sheets

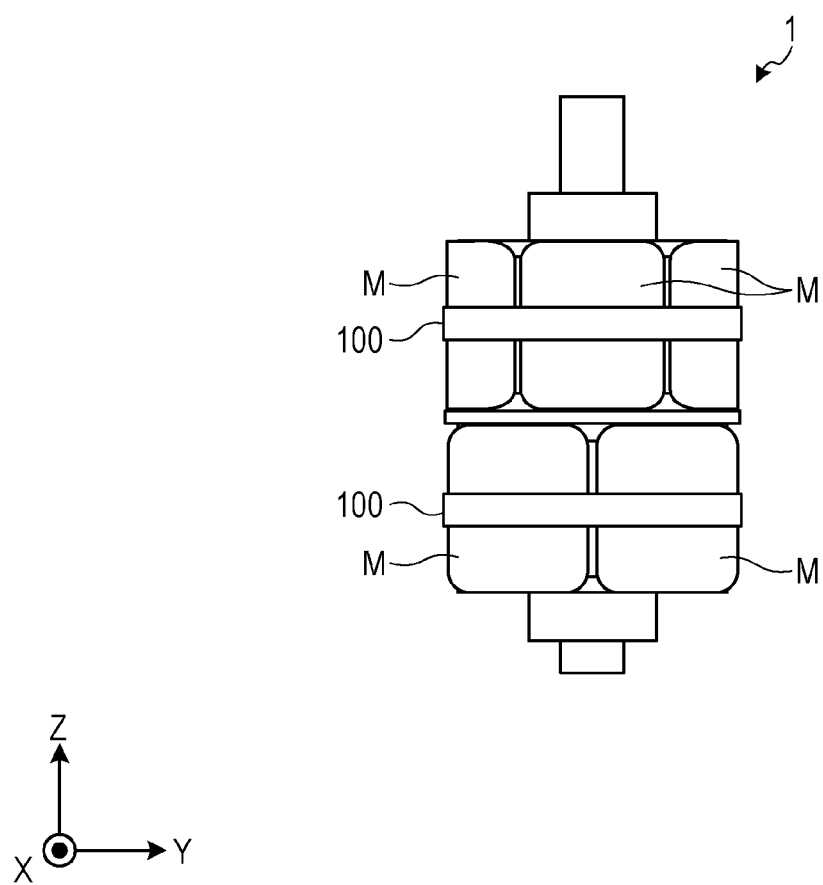

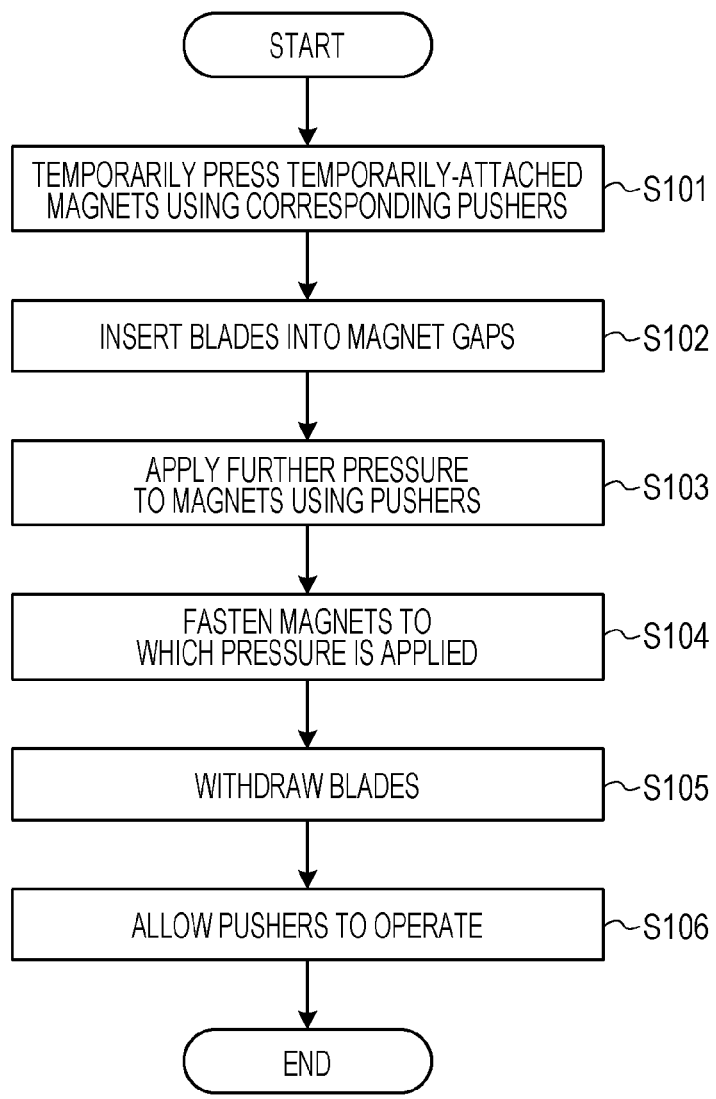

ROTOR MANUFACTURING METHOD

CROSS-REFERENCE TO RELATED APPLICATIONS

The present disclosure contains subject matter related to that disclosed in Japanese Priority Patent Application JP 2012-062148 filed in the Japan Patent Office on Mar. 19, 2012, the entire contents of which are hereby incorporated by reference.

BACKGROUND OF THE INVENTION

1. Field of the Invention

An embodiment disclosed herein relates to a rotor manufacturing apparatus, a rotor manufacturing method, and a permanent-magnet positioning method.

2. Description of the Related Art

A rotor of a rotating electrical machine having multiple permanent magnets attached to the circumferential surface of the rotor core is known to date. Preferably, the permanent magnets for such a rotor are disposed at equal intervals on the circumferential surface of the rotor core so that the magnetic flux is concentrated at a center portion between magnetic poles.

In view of this, a rotor is developed in which multiple axially-extending protrusions are disposed at equal intervals on the circumferential surface of the rotor core and permanents magnets are positioned by moving the permanent magnets along the side surfaces of the protrusions, and a method of manufacturing the rotor is developed (see Japanese Unexamined Patent Application Publication No. 2011-120328, for example).

When, for example, the rotor core is a multi-layer core obtained by stacking annular magnetic steel sheets, the above-described axially extending protrusions are formed by stacking protrusions formed on the outer circumference of the magnetic steel sheets.

SUMMARY OF THE INVENTION

A rotor manufacturing apparatus according to an aspect of the embodiment includes a pressing portion and multiple blade portions. The pressing portion presses a plurality of permanent magnets that are temporarily attached to a rotor core and arranged side by side in a circumferential direction of the rotor core from an outer side in a radial direction of the rotor core. The plurality of blade portions are individually inserted into gaps between the permanent magnets pressed by the pressing portion.

BRIEF DESCRIPTION OF THE DRAWINGS

FIG. 6 schematically illustrates a rotor core that has been processed.

FIG. 7 is a flowchart of processing performed by the rotor manufacturing apparatus.

DESCRIPTION OF THE EMBODIMENTS

Referring to the attached drawings, a rotor manufacturing apparatus, a rotor manufacturing method, and a permanent-magnet positioning method according to an embodiment of the disclosure are described in detail below. Note that the embodiment disclosed below does not limit the invention.

Description will be given below by taking a case of manufacturing a small rotor that is mounted on a small motor as an example. Hereinbelow, permanent magnets attached to the circumferential surface of a rotor core will be described as "magnets", which are segment magnets obtained by segmentation.

For easy description, some drawings used in the following description have a three-dimensional orthogonal coordinate system including the Z axis whose orientation vertically upward is regarded as a positive direction and whose orientation vertically downward (that is, a vertical direction) is regarded as a negative direction.

Also for easy description below, in the case of describing multiple identical components, only one of the multiple components may be denoted by a reference symbol and the others may not be. In that case, the one component denoted by the reference symbol and the other components are regarded as having the same configuration. The arrows indicating the movement of each component will be denoted or not be denoted in the same manner.

Figure 1A:
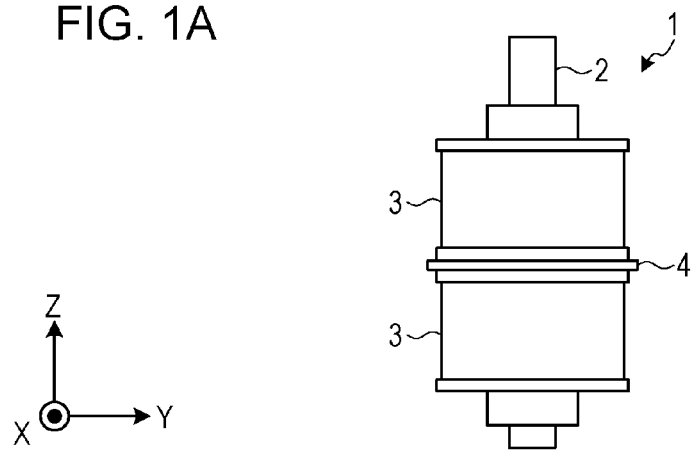
FIG. 1A is a (first) schematic diagram of a rough procedure of an upstream process.
Figure 1B:
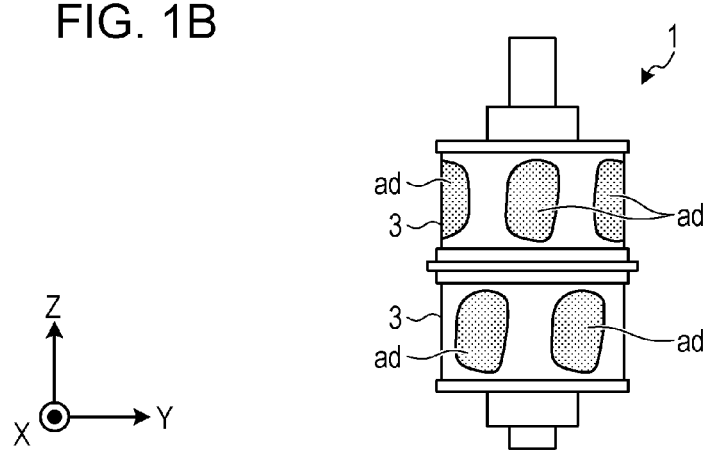
FIG. 1B is a (second) schematic diagram of a rough procedure of an upstream process.
Figure 1C:
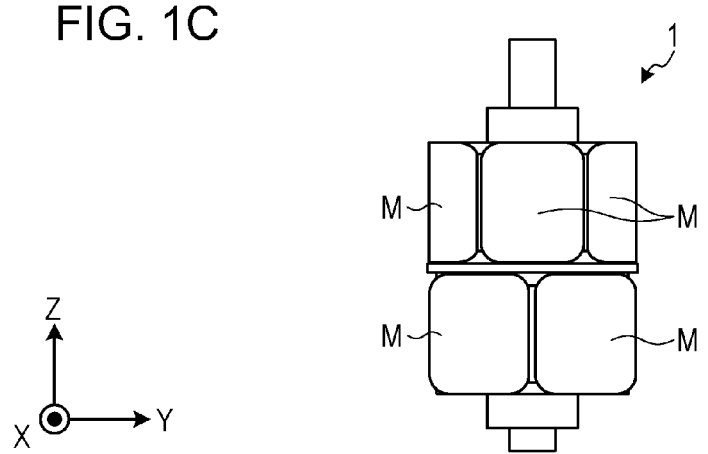
FIG. 1C is a (third) schematic diagram of a rough procedure of an upstream process.

Before describing the rotor manufacturing apparatus according to the embodiment, description will be first given on a schematic procedure using the rotor manufacturing apparatus in an upstream process. FIG. 1A to FIG. 1C are (first to third) schematic diagrams of the schematic procedure in the upstream process.

As illustrated in FIG. 1A, a rotor core 1 is formed into a substantially columnar shape integrally including a shaft, which is a rotation shaft, by performing cutting using a lathe or by other ways. The rotor core 1 includes recesses 3 and a protrusion 4 that extend throughout the circumference.

As illustrated in FIG. 1B, an adhesive ad is applied to the rotor core 1 by a device such as an application device, which is not illustrated. The adhesive ad is applied to a predetermined portion of each recess 3. From the view point of the strength or heat resistance, a thermosetting adhesive is used as an example of the applied adhesive ad.

As illustrated in FIG. 1C, magnets M are attached to the rotor core 1 by a device such as an attaching device, which is not illustrated. The attachment here is a "temporary attachment" of the magnets M. In the rotor manufacturing apparatus according to the embodiment, these "temporarily attached"

magnets M are individually positioned at appropriate circumferential positions such that the magnetic flux is concentrated at a center portion between magnetic poles.

FIG. 1A to FIG. 1C illustrate the case where the magnets M are attached to the circumferential surface of the rotor core 1 at two levels in the axial direction (that is, in the direction in which the shaft 2 extends). The protrusion 4 illustrated in FIG. 1A is a portion that positions the magnets M in the axial direction of the rotor core 1 in the above case.

Figure 2A:
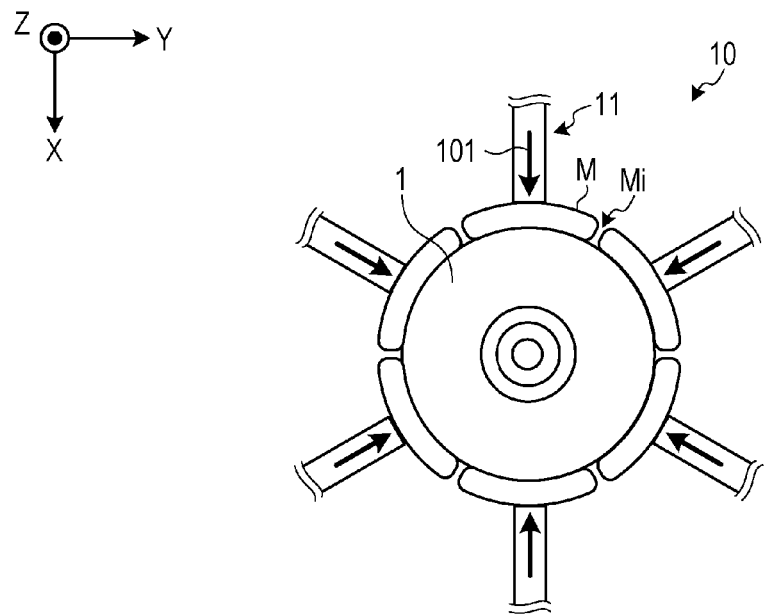
FIG. 2A is a (first) schematic diagram of a configuration and an operation of a rotor manufacturing apparatus according to the embodiment when viewed from above.
Figure 2B:
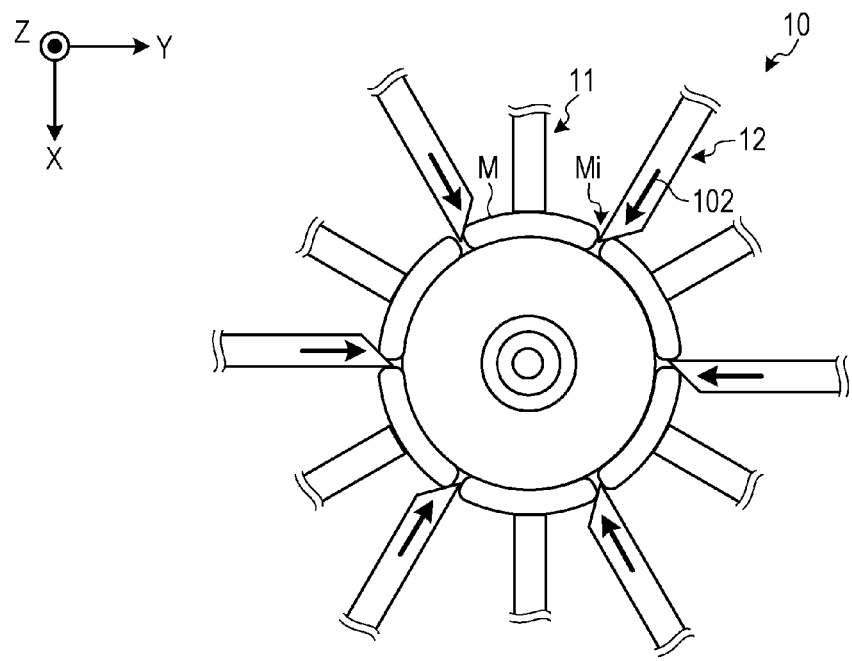
FIG. 2B is a (second) schematic diagram of a configuration and an operation of the rotor manufacturing apparatus according to the embodiment when viewed from above.

Hereinbelow, a configuration and an operation of the rotor manufacturing apparatus according to the embodiment will be specifically described. FIG. 2A and FIG. 2B are (first and second) schematic diagrams of a configuration and an operation of a rotor manufacturing apparatus 10 according to the embodiment when viewed from above.

As illustrated in FIG. 2A, the rotor manufacturing apparatus 10 includes pushers 11 (pressing portions). The number of pushers 11 corresponds to the number of magnets M. The pushers 11 are radially arranged. The pushers are driven independently of one another by individual air cylinders or other devices.

As illustrated in FIG. 2A, the pushers 11 press the magnets M (see FIG. 1C) that have been temporarily attached in the upstream process from the radially outer side toward the circumferential surface of the rotor core 1 (see the arrow 101 of FIG. 2A). Here, the pushers 11 press the magnets M with such a pressing force as to temporarily press the magnets M (a first pressing force).

Hereinbelow, a gap between two magnets M will be called a "magnet gap" and denoted by the reference symbol "Mi" as illustrated in FIG. 2A.

As illustrated in FIG. 2B, the rotor manufacturing apparatus 10 includes blades 12 (or blade portions). The number of blades 12 corresponds to the number of magnet gaps Mi and the blades are also arranged radially. As in the case of the pushers 11, the blades are driven independently of one another by individual air cylinders or other devices.

As illustrated in FIG. 2B, the blades 12 are inserted into the magnet gaps Mi while the magnets M are pressed by the pushers 11 with such a magnitude of force as to temporarily press the magnets M (see the arrow 102 of FIG. 2B).

Figure 3A:
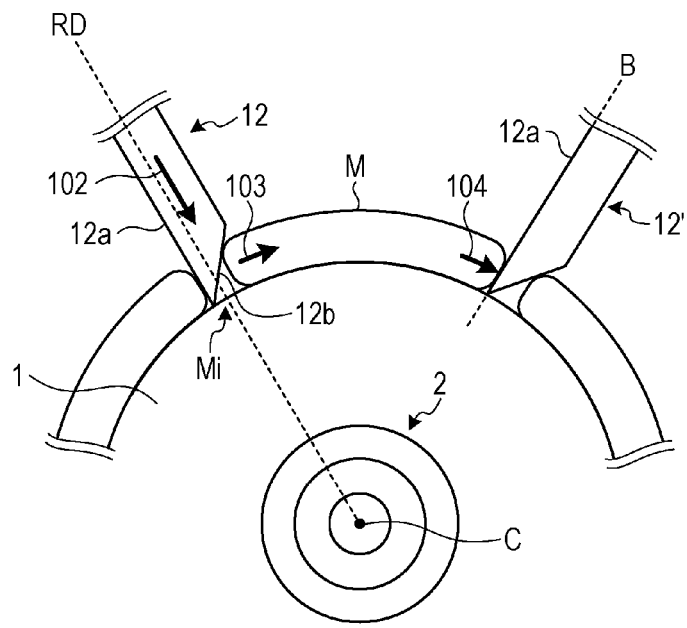
FIG. 3A is a schematic diagram illustrating positioning of magnets.

Here, positioning of the magnets M performed by inserting the blades 12 will be described in detail. FIG. 3A schematically illustrates positioning of the magnets M. For easy understanding, FIG. 3A excludes illustration of the pushers 11 that press the magnets M.

The axis RD illustrated in FIG. 3A is an axis representing one radial direction extending from the rotation center C of the shaft 2. Although the blade 12 and a blade that is adjacent to the blade 12 are the same components, the adjacent blade is denoted by "12'" in order to be distinguished from the blade 12.

As illustrated in FIG. 3A, the blade 12 has an end face (hereinafter referred to as a "straight face") 12a and a tapered face 12b at its tip end portion, the end face 12a being substantially parallel to the axis RD and intersecting with the circumferential direction of the rotor core 1, the tapered face 12b obliquely intersecting with the axis RD.

When the blade 12 is inserted into the magnet gap Mi (see the arrow 102 of FIG. 3A), the blade 12 causes the magnet M that comes into contact with the tapered face 12b to move along the tapered face 12b. In other words, the blade 12 shifts the magnet M in the circumferential direction of the rotor core 1 (see the arrow 103 of FIG. 3A), and thus the magnet M is pressed against the straight face 12a of the blade 12' (see the arrow 104 of FIG. 3A).

Consequently, the magnet M is positioned at a predetermined position by using the straight face 12a of the blade 12' as a standard surface B. Here, all the temporarily attached magnets M that are arranged side by side in the circumferential direction of the rotor core 1 are positioned simultaneously.

Thus, at least one side of each magnet M, is shifted to the predetermined position determined by the corresponding standard surface B even if the magnet M has a dimensional error. Consequently, the magnetic flux can be concentrated at a center portion between the magnetic poles.

FIG. 3A illustrates the blade 12 having the straight face 12a and the tapered face 12b, but this is not the only limitation. A modification will be described with reference to FIG. 3B.

Figure 3B:
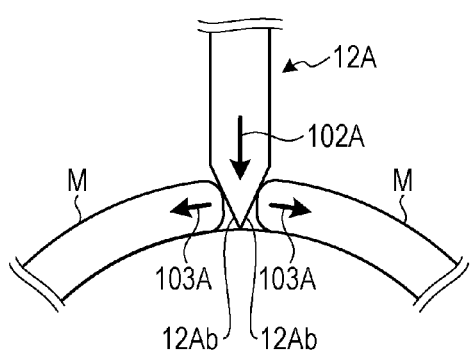
FIG. 3B is a schematic diagram of an example of a configuration of a blade according to a modification.

FIG. 3B is a schematic diagram of a configuration of a blade 12A according to the modification. As illustrated in FIG. 3B, a blade 12A having tapered faces 12 Ab that individually come into contact with adjacent two magnets M may be used.

In this case, the inserted blade 12A (see the arrow 102A of FIG. 3B) moves the magnets M in the left and right directions indicated by the arrows 103A. Here, adjacent other blades 12A (not illustrated) also apply similar forces to move the magnets M. Thus, with the equilibrium of the forces, the magnets M can be positioned at predetermined positions.

Figure 4A:
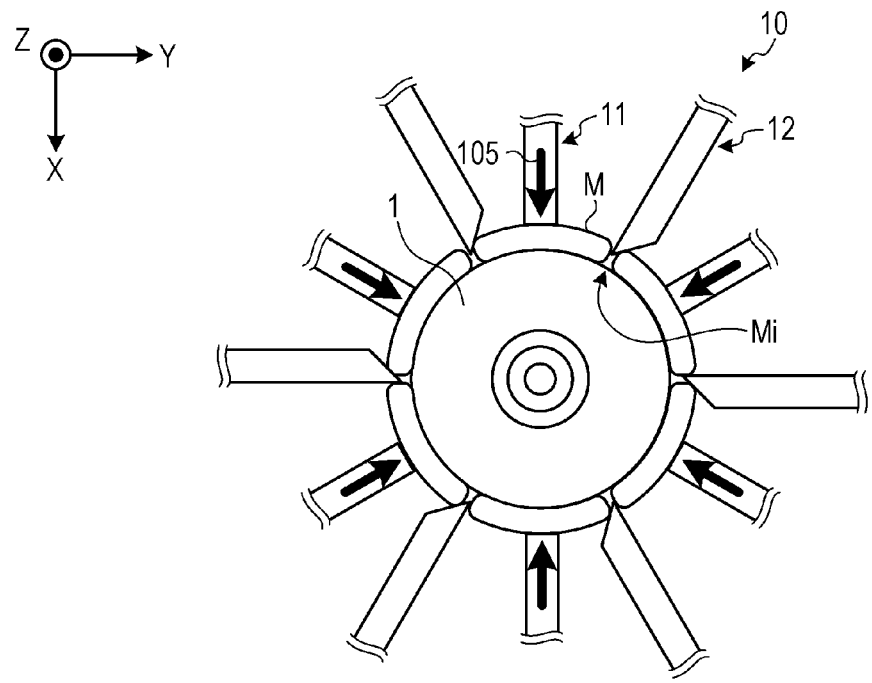
FIG. 4A is a (third) schematic diagram of a configuration and an operation of the rotor manufacturing apparatus according to the embodiment when viewed from above.
Figure 4B:
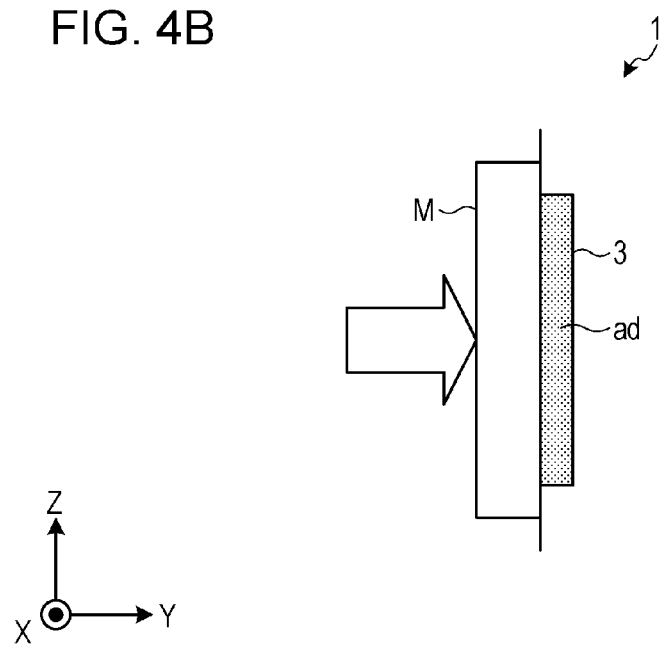
FIG. 4B schematically illustrates a recess of the rotor core in an enlarged manner.

Description of the configuration and the operations of the rotor manufacturing apparatus 10 according to the embodiment is continued. FIG. 4A is a (third) schematic diagram of a configuration and an operation of the rotor manufacturing apparatus 10 according to the embodiment when viewed from above. FIG. 4B schematically illustrates a recess 3 of the rotor core 1 in an enlarged manner.

As illustrated in FIG. 4A, the rotor manufacturing apparatus 10 further presses the magnets M, which have been pressed against the blades 12 or whose positions on the circumference of the rotor core 1 are determined, using the pushers 11 toward the circumferential surface from the radially outer side of the rotor core 1 (see the arrow 105 of FIG. 4A).

Here, as illustrated in FIG. 4B, the magnet M is further pressed with a predetermined force (a second pressing force), which is larger than the first pressing force and which is preadjusted to such a magnitude that the film thickness of the adhesive ad applied to the recesses 3 becomes uniform when the adhesive ad is pressed by the magnet M. Making the film thickness of the adhesive ad uniform in this manner improves the adhesion of the adhesive ad. Hereinbelow, pressing with the second pressing force is also referred to as "applying pressure".

Figure 5A:
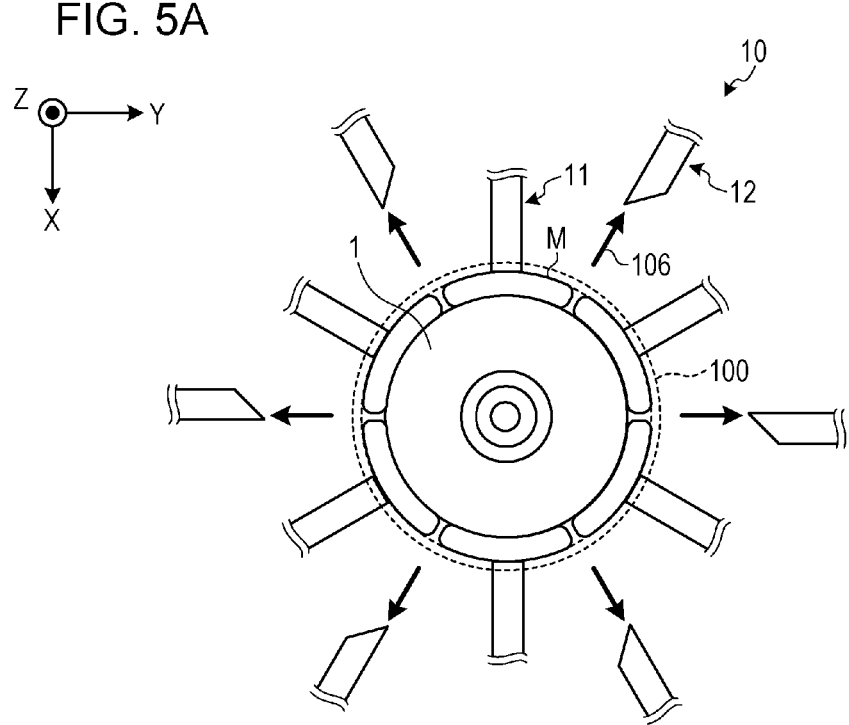
FIG. 5A is a (fourth) schematic diagram of a configuration and an operation of the rotor manufacturing apparatus according to the embodiment when viewed from above.
Figure 5B:
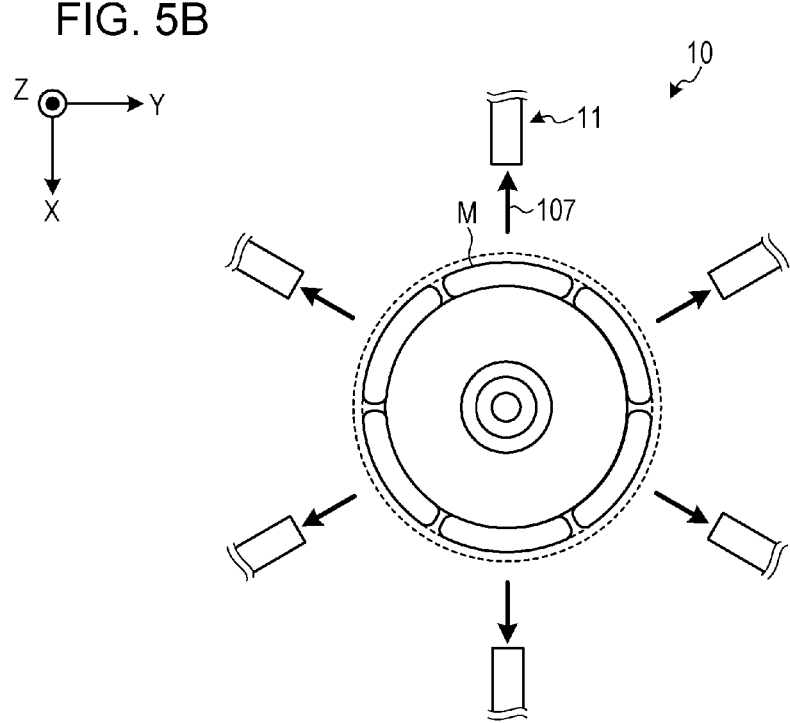
FIG. 5B is a (fifth) schematic diagram of a configuration and an operation of the rotor manufacturing apparatus according to the embodiment when viewed from above.

Subsequently, the rotor manufacturing apparatus 10 withdraws the blades 12 and allows the pushers 11 to operate. FIG. 5A and FIG. 5B are (fourth and fifth) schematic diagrams of a configuration and an operation of the rotor manufacturing apparatus 10 according to the embodiment when viewed from above.

As illustrated in FIG. 5A, before the rotor manufacturing apparatus 10 performs the above operation, the magnets M may be fastened by a fastening member 100 or another device.

The use of such a device prevents the positioned magnets M from slipping down due to their weight before the adhesive ad cures. Hereinbelow, description will be given on the assumption that the magnets M are fastened by the fastening member 100.

As illustrated in FIG. 5A, the rotor manufacturing apparatus 10 withdraws the blades 12 before withdrawing the pushers 11 (see the arrow 106 of FIG. 5A). In other words, the blades 12 are withdrawn while the pushers 11 are pressing and holding the magnets M from the radially outer side of the rotor core 1. Thus, even though the blades 12 are asynchronously withdrawn, the magnets M are prevented from moving in the circumferential direction.

As illustrated in FIG. 5B, after withdrawing the blades 12, the rotor manufacturing apparatus 10 stops applying pressure to the magnets M by allowing the pushers 11 to operate (see the arrow 107 of FIG. 5B).

In this manner, a series of processes (see FIG. 2A to FIG. 5B) of the rotor manufacturing apparatus 10 are completed. As illustrated in FIG. 1A to FIG. 1C, in the case where the magnets M are attached to the circumferential surface of the rotor core 1 at multiple (two, for example) levels, the above-described series of processes is repeated for each level.

As illustrated in FIG. 6, the rotor manufacturing apparatus 10 hands over the rotor core 1 in which the magnets M are positioned and fastened by the fastening member 100 to a downstream process as a processed product.

In the downstream process, if, for example, the adhesive ad is a thermosetting adhesive, a heating process or the like is performed to set the adhesive ad (see FIG. 4B).

Now, the procedure of processes performed by the rotor manufacturing apparatus 10 described thus far will be shown. FIG. 7 is a flowchart of the procedure of the processes performed by the rotor manufacturing apparatus 10.

As illustrated in FIG. 7, first, the rotor manufacturing apparatus 10 temporarily presses the temporarily attached magnets M using the pushers 11 from the radially outer side to the circumferential surface of the rotor core 1 (Step S101).

The rotor manufacturing apparatus 10 then inserts the blades 12 into the corresponding magnet gaps Mi (Step S102).

Then, using the pushers 11, the rotor manufacturing apparatus 10 further applies pressure to the magnets M whose circumferential positions have been determined by the blades 12 (Step S103).

Then, using the fastening member 100, the rotor manufacturing apparatus 10 fastens the magnets M to which pressure is applied (Step S104).

The rotor manufacturing apparatus 10 then withdraws the blades 12 (Step S105). After withdrawing the blades 12, the rotor manufacturing apparatus 10 allows the pushers 11 to drive (Step S106) and finishes processing.

As described above, the rotor manufacturing apparatus according to the embodiment includes pushers (pressing portions) and multiple blades (blade portions). The pushers press multiple temporarily attached magnets (permanent magnets) arranged side by side in the circumferential direction of the rotor core from the radially outer side of the rotor core. The multiple blades are individually inserted into gaps between the magnets pressed by the pushers.

Thus, the rotor manufacturing apparatus according to the embodiment is capable of appropriately positioning the permanent magnets even in a small rotor while keeping costs low.

In the above described embodiment, the case of manufacturing small rotors mainly for small motors is taken as an example. However, the size of a motor or rotor is not limited. Thus, the present disclosure is applicable to, for example, a middle or large motor having a configuration in which segment magnets are arranged side by side in the circumferential direction of the rotor core.

In the above-described embodiment, a case is described where the magnets are attached to the circumferential surface of the rotor core at two levels in the axial direction. The magnets may be attached at levels exceeding two. The magnets may be attached at one level, instead.

In the above-described embodiment, a fastening member formed into a belt is taken as an example, but this is not the only limitation. For example, the fastening member may be a member having a bracket shape through which the shaft penetrates and that covers the end portion of the rotor core.

The present disclosure is applicable to not only the case of attaching segment magnets to the circumferential surface of the rotor core but also the case of manufacturing products that require attachment of segment parts to a circumferential surface in the circumferential direction.

Those skilled in the art may easily conceive of further effects and modifications. Thus, broader aspects of the present disclosure are not limited by specific details and the exemplary embodiment illustrated and described thus far. Therefore, various changes are possible without departing from the spirit and the scope of the general concept of the present disclosure defined by the scope of the appended claims and their equivalents.

What is claimed is:

1. A permanent-magnet positioning method comprising:
a pressing step of pressing a plurality of permanent magnets temporarily attached to a rotor core and arranged side by side in a circumferential direction of the rotor core from an outer side in a radial direction of the rotor core; and
a positioning step of positioning the permanent magnets in the circumferential direction by individually inserting a plurality of blade portions into gaps between the permanent magnets that have been pressed since the pressing step so that each of the permanent magnets contacting a first one of the blade portions is moved in the circumferential direction and thus pressed against a second one of the blade portions that is adjacent to the first one of the blade portions.

2. The permanent-magnet positioning method according to claim 1, wherein the pressing step is performed by pressing the plurality of permanent magnets in radial directions by a plurality of pushers.

3. The permanent-magnet positioning method according to claim 1, wherein, during the positioning step, the plurality of blade portions are inserted into the gaps by moving the plurality of blade portions in radial directions.

4. The permanent-magnet positioning method according to claim 1, wherein, during the positioning step, the plurality of blade portions are inserted into the gaps while the plurality of permanent magnets are simultaneously pressed in radial directions by a plurality of pushers.

5. The permanent-magnet positioning method according to claim 1, wherein the plurality of blade portions each have an end including a straight face extending in a direction parallel to the radial direction and a tapered face.

6. The permanent-magnet positioning method according to claim 1, wherein the plurality of blade portions each have an end including two tapered faces.

7. The permanent-magnet positioning method according to claim 1, further comprising:
an additional pressing step of further pressing the permanent magnets that have been positioned in the positioning step from an outer side in the radial direction with a pressing force that is larger than a pressing force used in the pressing step.

8. The permanent-magnet positioning method according to claim 7,
wherein the rotor core has an outer surface having a recess thereon, the recess having an adhesive provided within the recess, and wherein the additional pressing step presses the permanent magnets against the adhesive such that the adhesive has a uniform film thickness.

9. The permanent-magnet positioning method according to claim 8, further comprising a fastening step of fastening the magnets by a fastening member provided about an outer periphery of the plurality of permanent magnets.

10. The permanent-magnet positioning method according to claim 1, further comprising repeating the pressing step and the positioning step on a plurality of permanent magnets to form a second level on the rotor core.

11. A rotor manufacturing method comprising:
   a first pressing step of pressing a plurality of permanent magnets temporarily attached to a rotor core and arranged side by side in a circumferential direction of the rotor core from an outer side in a radial direction of the rotor core;
   a positioning step of positioning the permanent magnets in the circumferential direction by individually inserting a plurality of blade portions into gaps between the permanent magnets that have been pressed since the pressing step so that each of the permanent magnets contacting a first one of the blade portions is moved in the circumferential direction and thus pressed against a second one of the blade portions that is adjacent to the first one of the blade portions;
   a second pressing step of further pressing the permanent magnets that have been positioned in the positioning step from an outer side in the radial direction with a pressing force that is larger than a pressing force used in the first pressing step; and
   a withdrawing step of withdrawing the blade portions while the permanent magnets remain in a state of being pressed which has existed since the second pressing step.

12. The rotor manufacturing method according to claim 11, wherein the first pressing step is performed by pressing the plurality of permanent magnets in radial directions by a plurality of pushers.

13. The rotor manufacturing method according to claim 11, wherein, during the positioning step, the plurality of blade portions are inserted into the gaps by moving the plurality of blade portions in radial directions.

14. The rotor manufacturing method according to claim 11, wherein, during the positioning step, the plurality of blade portions are inserted into the gaps while the plurality of permanent magnets are simultaneously pressed in radial directions by a plurality of pushers.

15. The rotor manufacturing method according to claim 11, wherein the plurality of blade portions each have an end including a straight face extending in a direction parallel to the radial direction and a tapered face.

16. The rotor manufacturing method according to claim 11, wherein the plurality of blade portions each have an end including two tapered faces.

17. The rotor manufacturing method according to claim 11,
   wherein the rotor core has an outer surface having a recess thereon, the recess having an adhesive provided within the recess, and
   wherein the second pressing step presses the permanent magnets against the adhesive such that the adhesive has a uniform film thickness.

18. The rotor manufacturing method according to claim 11, further comprising a fastening step of fastening the magnets by a fastening member provided about an outer periphery of the plurality of permanent magnets.

19. The rotor manufacturing method according to claim 18, wherein the fastening step is performed before the withdrawing step.

20. The rotor manufacturing method according to claim 11, further comprising repeating the first pressing step, the positioning step, the second pressing step, and the withdrawing step on a plurality of permanent magnets to form a second level on the rotor core.

* * * * *